United States Patent [19]

Maitland

[11] 3,917,039
[45] Nov. 4, 1975

[54] CONDUCTOR RAIL

[75] Inventor: Alexander Maitland, Schaffhausen, Switzerland

[73] Assignee: Swiss Aluminium Ltd., Neuhausen am Rheinfall, Switzerland

[22] Filed: Mar. 15, 1973

[21] Appl. No.: 341,345

[30] Foreign Application Priority Data
Mar. 17, 1972 Switzerland.......................... 4031/72

[52] U.S. Cl............................... 191/29 DM; 238/43
[51] Int. Cl.²........................................... B60M 1/30
[58] Field of Search.......... 191/22 R, 22 DM, 29 R, 191/29 DM, 33 DM; 238/43, 48

[56] References Cited
UNITED STATES PATENTS

| 319,041 | 2/1885 | VanChoate | 238/48 |
| 923,150 | 1/1909 | Davis | 238/143 |
| 1,101,579 | 6/1914 | Steinberger | 191/33 DM |
| 3,582,575 | 6/1971 | Scofield | 191/29 DM |

Primary Examiner—M. Henson Wood, Jr.
Assistant Examiner—D. W. Keen
Attorney, Agent, or Firm—Ernest F. Marmorek

[57] ABSTRACT

A conductor rail for current supply to a pick-up in a rail vehicle comprises a body of a material with good electrical conductivity like aluminium and a facing of another material with high wear resistance, like steel. The facing is releasably secured to the body for example by clamping and has a curved shape in cross section such that a compressive force between facing and body is achieved when mounted.

6 Claims, 2 Drawing Figures

U.S. Patent  Nov. 4, 1975  3,917,039
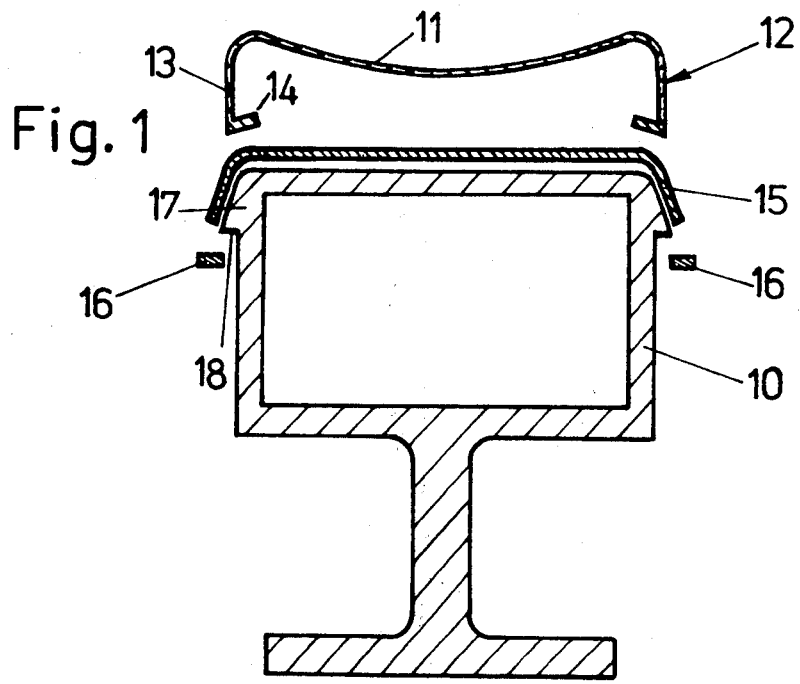
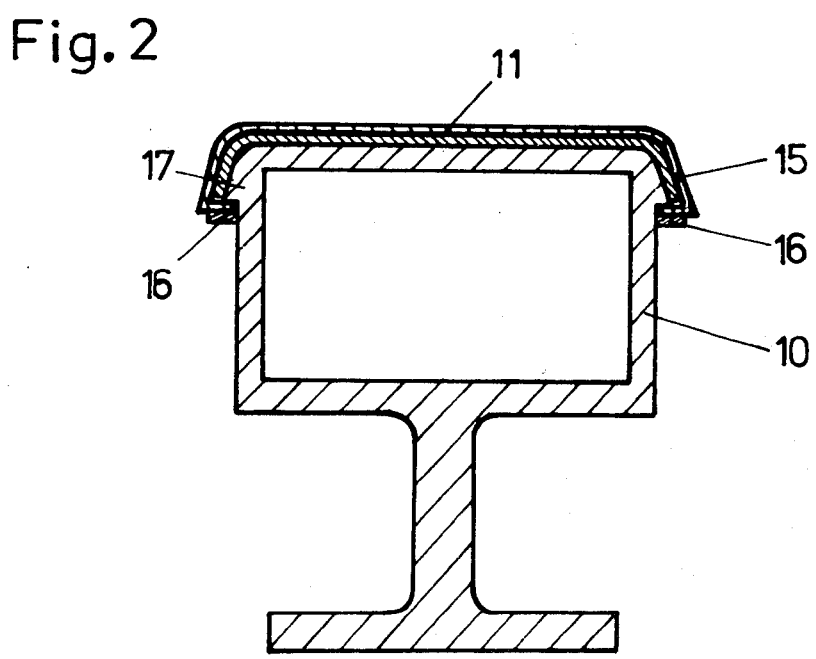

CONDUCTOR RAIL

Electrical energy may be supplied to electrical vehicles running on rails, e.g. railways, cranes, etc. through conductor rails. The conductor rails have to satisfy predetermined mechanical, mechanical-technological, and electrical requirements. Thus a high rigidity, a good resistance to abrasion, and electrical conductivity have to be provided by them. The mechanical requirements are relatively easy to satisfy by a corresponding shaping of the conductor rail cross section. Usually metallic materials with a good electrical conductivity have a relatively poor resistance to abrasion, so that, to satisfy the electrical and mechanical-technological requirements, one is compelled to make conductor rails as composite bodies. Generally in conductor rails the bodies consist of a material which is a good electrical conductor, as for example aluminium, on which is applied a facing of an abrasion-resistant material as for example a steel. The conduction of current by the composite body is indeed not ideal, but having regard to the resistance to wear which has also to be provided, a best possible technical compromise has been achieved.

A known composite body of this kind consists of an I-section carrier, in the web of which openings are made. Aluminum bars are rolled against the web and between the flanges, and become anchored into the openings. The facing, resisting abrasion and making engagement with a pick-up, is here constituted by one of the two flanges. The current is fed into the aluminium bars and flows through the web in the direction towards the flange.

In conductor rails it is important to have an even surface finish so that the conductor shoe will always remain in contact with the rail. Particularly at high speeds the conductor shoe may bounce and cause electrical arcing if the rail is not even. Furthermore if the surface becomes rough as a result of arcing or localised corrosion then the contact shoe will be consumed as a result of accelerated wear. In the special case of high speed railways therefore the dimension of the facing with particular reference to its surface condition is of considerable significance and frequent treatment of the facing may be necessary to maintain the surface in a condition which fulfils the tolerances. For the known rail the entire rail would have to be dismantled or would have to be machined to the original evenness and in either case would involve considerable expenditure in order to repair or replace the said rail.

The present invention takes account of the mechanical-technological, electrical, and economic requirements in a conductor rail, especially for high-speed railways, where "high speed railways" should be understood as meaning such railways as attain maximum speeds of 400 to 500 Km/h. According to this invention the body and the facing of a conductor rail are releaseably connected together.

The body, consisting of a material which is a good electrical conductor, undergoes no kind of mechanical wear. Wear has to be withstood practically only by a facing made of a ferreous material, resistant to wear. If now the facing is releasably secured to the body, as provided according to the invention, then after attainment of a predetermined degree of wear, only the facing undergoes exchange, while the body remains along the entire length of conductor rail, with simplification of supervision and with the least possible disturbance of traffic.

Preferably the body and the facing are assembled by means of a clamping engagement. A clamping engagement resulting from the natural elastic properties of the material used for the facing is preferred, because in articles of the mentioned kind, by means of the spring action force residing in it when assembled, it ensures a constant pressing of the facing against the body, automatically and under all ambient conditions, by which means inadmissible high contact resistances between the body and the facing are avoided.

Preferably the clamping arrangement consists of flanges arranged along the longitudinal sides of the facing, with extensions arranged at their free ends and engageable with the body. With this formation the facing with the clamping arrangement can be manufactured in one piece for example by roll-forming or another forming process, and this contributes significantly to the economic manufacture of a conductor rail according to the invention. If the facing and the clamping arrangement form a channel-shaped section open to one side, then on union of facing and body, one part of the body is enclosed so as to be protected from corrosion.

The said spring engagement may be attained by corresponding shaping either of the flanges or of the extensions. Furthermore it is suitable to make the facing convex towards the body to be engaged. This has the advantage that after assembly the facing itself due to the spring action abuts completely and strongly across its whole width against the corresponding surface of the body, thereby achieving an efficient electrical contact between body and facing.

Preferably a layer is introduced between the body and the facing to assist transmission of current from the body to the facing. Suitable materials for this layer are for example conducting greases which may contain fine particles of soft metal like zinc powder or graphite. Such conducting greases are readily available on the market today and have the added advantage of excluding moisture from the interface between the body and the facing and so prevent corrosion in this region. Other material usable for the said layer may be a soft metal, for example zinc. As already mentioned, facing and clamping arrangement can be made in the form of a channel-shaped section while in the assembled condition the section covers corresponding faces of the body so protecting it from corrosion. The preventionn of corrosion can be further intensified if the leading ends of the extensions are covered with an insulation for example of viscous grease or synthetic material.

The accompanying drawings show one embodiment of the invention, by way of example. In these drawings:

FIG. 1 is a cross section of the conductor rail showing its components separated; and FIG. 2 is a cross section of the conductor rail assembled. The conductor rail shown consists of a body 10, a facing 11, a clamping arrangement 12 comprising flanges 13 and extensions 14, and intermediate layer 15, and insulation 16.

The body 10 is preferably an extrusion of a material which is a good electrical conductor, as for example aluminium or an aluminium alloy. In cross section it includes a box-shaped portion, which on its lower side has a web with a flange, which presents the under surface by which the body 10 is supported in use (by means not shown). The upper side of the box-shaped portion is intended for application of the facing 11. The facing 11, consisting of a ferreous material resistant to abrasion, is integral with the clamping arrangement 12.

Such channel like facings may be formed by rolling from a band of steel, like a 18/8-Cr-Ni steel, which exhibits a sufficient spring effect for the purpose intended and shows good compatibility with aluminium with respect to corrosion behavior. The thickness of the facing will be selected in accordance with the mechanical properties of the steel and the width of the body and will be for example about 1 to 3 mm for a width of about 7 cm.

As seen in cross section in the drawings, the clamping arrangement 12 consists of downwardly directed flanges 13 arranged along the longitudinal sides of the facing 11, with inwardly directed extensions 14 at their free ends, engageable with the body 10.

Near the upper side of the box-shaped portion of the body, and extending along the longitudinal sides of the box-shaped portion, there are projections 17, each provided with an abutment surface 18 on its side facing towards the flange of the body. The longitudinal sides of the projections 17 are in the present case formed extending from the upper side of the box shaped portion to the respective abutment surface, and thus inclined outwards as seen from the centre line of the section. FIG. 2 shows the conductor rail in assembled condition. The facing 11 has an upper surface parallel to the upper side of the box-shaped portion, and capable of making engagement with a current pick-up (not shown). Preferably, as shown, there is an intermediate layer 15, for example of conductive grease or of zinc, between the upper side of the box-shaped portion and the facing 11, and between the longitudinal sides of the projections 17 and the flanges 13. In the assembled condition, the flanges 13 also extend parallel to the longitudinal sides of the projections 17.

In the example as shown in the figures the flanges 13 and the extensions 14 describe an acute angle. Of course other shapes of the clamping arrangement are possible showing a curved form, for example an S-shape which will allow easy assembly and also ensure fixation on the body having correspondingly curved projections at the sides. Alternatively it is possible to secure the facing to the body by means of separate spring clips engageable in grooves of the facing and securing points for example recesses of the body.

The stress necessary for a strong contact between the facing 11 and the body 10 is produced by the provision of the curve-shaped formation of the facing 11. Upon the union of the facing 11 with the body 10, the facing is put under pressure, so that the facing 11 abuts against the upper side of the box-shaped portion, the flanges assume the position referred to, with reference to the longitudinal sides of the projections 17, and the extensions 14 become engaged with the abutment surfaces 18 of the projections 17. Thus a secure fastening of the facing to the body is ensured with or without inclusion of an intermediate layer 15. The shape of the facing, responsible for the stresses after assembly, is so proportioned that ambient influences, as for example heat, will not exert a detracting influence on the connection.

The curved facing shown in FIG. 1 may also be provided with flanges 13 only, that is without extensions 14, the facing being fixed on the body by means of screws, rivets, nails or the like, the flanges providing a stiffening of the edges of the facing resulting in a more even pick-up surface. Alternatively an extension 14 may be provided on the one long side of the facing for hooking under the projection 17, the flange on the other side being fixed by means of screws, rivets, nails or the like.

In order to exclude corrosion,, especially between the extensions 14 and the abutment surfaces 18, the lower faces of the extensions 14 are covered with insulation 16, for example of a plastic material, which abuts both the lower faces of the extensions 14 and the respective longitudinal sides of the box-shaped portion of the body 10.

What we claim is:

1. A substantially inflexible conductor rail for current supply to a pick-up in a rail vehicle, the conductor rail comprising
   a substantially inflexible body, composed of material which is a good electrical conductor,
   a facing composed of material resistant to wear, for engagement by the pick-up, and
   resilient clamp means operable for releasably securing the facing to the body.

2. A conductor rail as claimed in claim 1 including an intermediate layer of soft metal between the body and the facing.

3. A conductor rail according to claim 1 including an intermediate layer of conducting grease between the body and the facing.

4. A conductor rail for current supply to a pick-up in a rail vehicle, the conductor rail comprising a body, a facing for engagement by the pick-up, and resilient clamp means operable for releasably securing the facing to the body, said resilient clamp means comprising two flanges projecting from the longitudinal sides of the facing, and two extensions at the free ends of the arms, and said body including means capable of interengagement with the said extensions.

5. A conductor rail according to claim 4, including insulation covering the free ends of the extensions.

6. A conductor rail for current supply to a pick-up in a rail vehicle, the conductor rail comprising a body, a facing for engagement by the pick-up, and means for releasably securing the facing to the body, said facing, when detached from the body, has a curved cross section, the surface for contact with the body being convex in order to produce a pressure between facing and body when secured together.

* * * * *